United States Patent [19]

Sekiguchi et al.

[11] Patent Number: 5,621,944
[45] Date of Patent: Apr. 22, 1997

[54] WIPER ARM WITH VIBRATION DAMPING

[75] Inventors: Tohru Sekiguchi; Eiji Mimura, both of Kosai; Takashi Saito; Hideshi Sahara, both of Toyohashi; Takio Ohya, Musashino, all of Japan

[73] Assignee: Asmo Co., Ltd., Kosai, Japan

[21] Appl. No.: 529,804

[22] Filed: Sep. 18, 1995

Related U.S. Application Data

[63] Continuation of Ser. No. 95,512, Jul. 26, 1993, abandoned.

[30] Foreign Application Priority Data

Jul. 24, 1992 [JP] Japan ................................. 4-217465
Mar. 11, 1993 [JP] Japan ................................. 5-076477

[51] Int. Cl.⁶ ............................................. B60S 1/32
[52] U.S. Cl. ........................... 15/250.351; 15/250.31; 403/225
[58] Field of Search ........................... 15/250.35, 250.31, 15/250.34, 250.33, 250.21, 250.23; 403/228, 226, 225

[56] References Cited

U.S. PATENT DOCUMENTS

| | | | |
|---|---|---|---|
| 2,293,820 | 8/1942 | Hansen | 15/250.32 |
| 2,618,805 | 11/1952 | Rappl et al. | 15/250.33 |
| 2,711,553 | 6/1955 | O'Shei | 15/250.35 |
| 2,807,821 | 10/1957 | Scinta | 403/225 |
| 3,045,272 | 7/1962 | Oishei | 15/250.35 |
| 3,466,694 | 9/1969 | Fledstein | 95/250.351 |
| 3,978,542 | 9/1976 | Eekelen et al. | 15/250.35 |
| 4,326,848 | 4/1982 | George et al. | 403/225 |
| 4,615,067 | 10/1986 | Beneteau | 15/250.35 |
| 5,136,749 | 8/1992 | Lukaszewski | 15/250.31 |

FOREIGN PATENT DOCUMENTS

| | | | |
|---|---|---|---|
| 3714650 | 11/1988 | Germany . | |
| 3744237 | 7/1989 | Germany . | |
| 1-136056 | 9/1989 | Japan . | |
| 578353 | 6/1946 | United Kingdom | 15/250.35 |
| 612614 | 11/1948 | United Kingdom | 15/250.32 |
| 632981 | 12/1949 | United Kingdom | 15/250.33 |
| 2180145 | 3/1987 | United Kingdom | 15/250.35 |

*Primary Examiner*—Gary K. Graham
*Attorney, Agent, or Firm*—Kubovcik & Kubovcik

[57] ABSTRACT

Wiper device includes an arm system composed of an arm head, arm retainer and an arm piece that are connected together. The arm system has a movable portion which is capable of moving a wiping direction. A rubber vibration damper is disposed at the movable portion which is formed, for example, between the arm retainer and the arm piece of the arm system. When the wiper device is operating, an exciting force produced between the surface of a windshield and a wiper blade is transmitted to the arm piece and tends to oscillate the arm piece in the wiping direction about the movable portion. In this instance, the rubber vibration damper elastically deforms and dampens the vibrational force applied to the movable portion.

12 Claims, 10 Drawing Sheets

WIPER ARM WITH VIBRATION DAMPING

This application is a continuation of application Ser. No. 08/095,512 filed Jul. 26, 1993 now abandoned.

BACKGROUND OF THE INVENTION

1. Field of the Invention

The present invention relates to a wiper device for wiping the surface of a windshield, for example, of an automobile.

2. Description of the Prior Art

In general, conventional wiper devices include an arm head, an arm retainer and an arm piece. The arm head and the arm retainer are pivotally connected together via a pivot pin or shaft. The arm retainer and the arm piece are connected together by means of a rivet, an adjust screw or the like. A spring is connected between the arm head and the arm retainer to urge the arm piece and the arm retainer toward a surface of a windshield to be wiped, so that a wiper blade is held in pressure contact with the surface of the windshield.

When the conventional wiper device is operated to wipe the surface of the windshield, a slight exciting force is produced between the surface of the windshield and the wiper blade. The thus produced exciting force is transmitted to an arm system where it is enhanced due to self-excited vibration of the arm system. The self-excited vibration of the arm system eventually brings about chattering which may occur between the arm head and the arm retainer and between the arm retainer and the arm piece. Once the chattering occurs, the wiper device is unable to perform a reliable wiping operation.

To overcome the foregoing difficulties, various attempts have been made, but none of them was successful. More specifically, most of the prior attempts aimed at increasing the stiffness of the arm head, the arm retainer and the arm piece to such an extent that an exciting force produced between wiper blade and the surface of the windshield becomes minimum. In spite of such prior attempts, chattering still occurred with a limited amplitude of vibration.

SUMMARY OF THE INVENTION

It is, therefore, an object of the present invention to provide a wiper device which is capable of preventing the occurrence of self-excited vibration of an arm system, thereby performing a reliable wiping operation.

Another object of the present invention is to provide a wiper device which is durable in construction, attractive in appearance and easy to assemble.

A wiper device according to one aspect of the invention includes an arm system composed of an arm head, an arm retainer and an arm piece that are connected together. The arm system includes a movable portion which is capable of moving in a wiping direction. A rubber vibration damper is disposed at the movable portion for damping a vibrational force exerted on the movable portion via the arm piece.

According to one preferred embodiment of the invention, the movable portion of the arm system is formed between the arm retainer and the arm piece. The movable portion includes a pivot shaft about which the arm retainer and the arm piece are pivotally movable in the wiping direction. The rubber vibration damper may include a first rubber vibration damping member disposed on an end portion of the arm retainer which is adjacent to the arm piece, and a second rubber vibration damping member disposed on an end portion of the arm piece which is adjacent to the end of the arm retainer. The end portion of the arm piece is twisted at an angle of 90 degrees relative to the rest of the arm piece, and the second rubber vibration damping member embracing the one end portion of the arm piece. The first rubber vibration damping member preferably has a spring constant which is greater than a spring constant of the second rubber vibration damping member.

According to another preferred embodiment, the movable portion of the arm system is formed between the arm head and the arm retainer and is movable between the arm head and the arm retainer in the wiping direction.

According to a further preferred embodiment of the invention, the movable portion of the arm system is formed in the arm head. The arm head is composed of a first head portion and a second head portion which are spaced from one another. The first and second head portions are interconnected by the rubber vibration damper.

The movable portion at which the rubber vibration damper is disposed may be formed by any one of or two adjacent ones of the components of the arm system.

According to still another embodiment of the invention, the movable portion of the arm system is formed between the arm retainer and the arm piece. The movable portion includes a pivot shaft about which the arm retainer and the arm piece are pivotally movable in the wiping direction. The arm retainer has an end adjacent to the arm piece. The end of the arm retainer includes two confronting, cantilevered plate springs which converge toward each other and resiliently grip a portion of the arm piece.

In another aspect the present invention provides a wiper device which comprises an arm system composed of an arm head, an arm retainer and an arm piece that are connected together, and a rubber vibration damper and an elastic member that are disposed between the arm retainer and the arm piece. The rubber vibration damper and the elastic member interconnect the arm retainer and the arm piece so that the arm piece is supported in a floating manner relative to the arm retainer.

With this construction, when the wiper device is operating, an exciting force is produced between the surface of a windshield and a wiper blade of the wiper device. The exciting force thus produced is transmitted from the wiper blade to the arm piece whereupon the arm piece tends to move or oscillate in the wiping direction about a movable portion of the arm system. In this instance, since the rubber vibration damper is disposed at the movable portion, vibrational motion of the movable portion causes the rubber vibration damper to deform elastically. With this elastic deformation of the rubber vibration damper, the mechanical vibrational force or energy is converted into heat energy.

Thus, the rubber vibration damper prevents the arm system from causing self-excited vibration. The wiper device is, therefore, able to operate smoothly without causing chattering.

In the structure where the arm retainer and the arm piece are interconnected by a rubber vibration damper and an elastic member that are disposed in a spaced relation between the arm retainer and the arm piece, the arm piece is supported in a floating manner relative to the arm retainer. The arm retainer is allowed to move in the wiping direction due to elastic deformation of the elastic member. When the arm retainer oscillates about the elastic member, the rubber vibration damper elastically deforms in response to the movement of the arm retainer, thereby dampening vibrational force of the arm retainer.

As described above, the wiper device of the present invention includes an arm system having a movable portion which is capable of moving in a wiping direction of the wiper device. A rubber vibration damper is disposed at the movable portion. With this construction, a slight exciting force which is produced between the surface of a windshield and the wiper blade is transmitted to the arm piece which in turn tends to oscillate about the movable portion. In this instance, the rubber vibration damper elastically deforms and thereby converts the mechanical vibrational energy into the heat energy. Thus, the vibrational force on the arm piece is taken up, so that self-excited vibration of the arm system does not occur. The wiper device is able to operate smoothly and reliably without producing an unpleasant chattering noise.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE INVENTION

Figure 1:
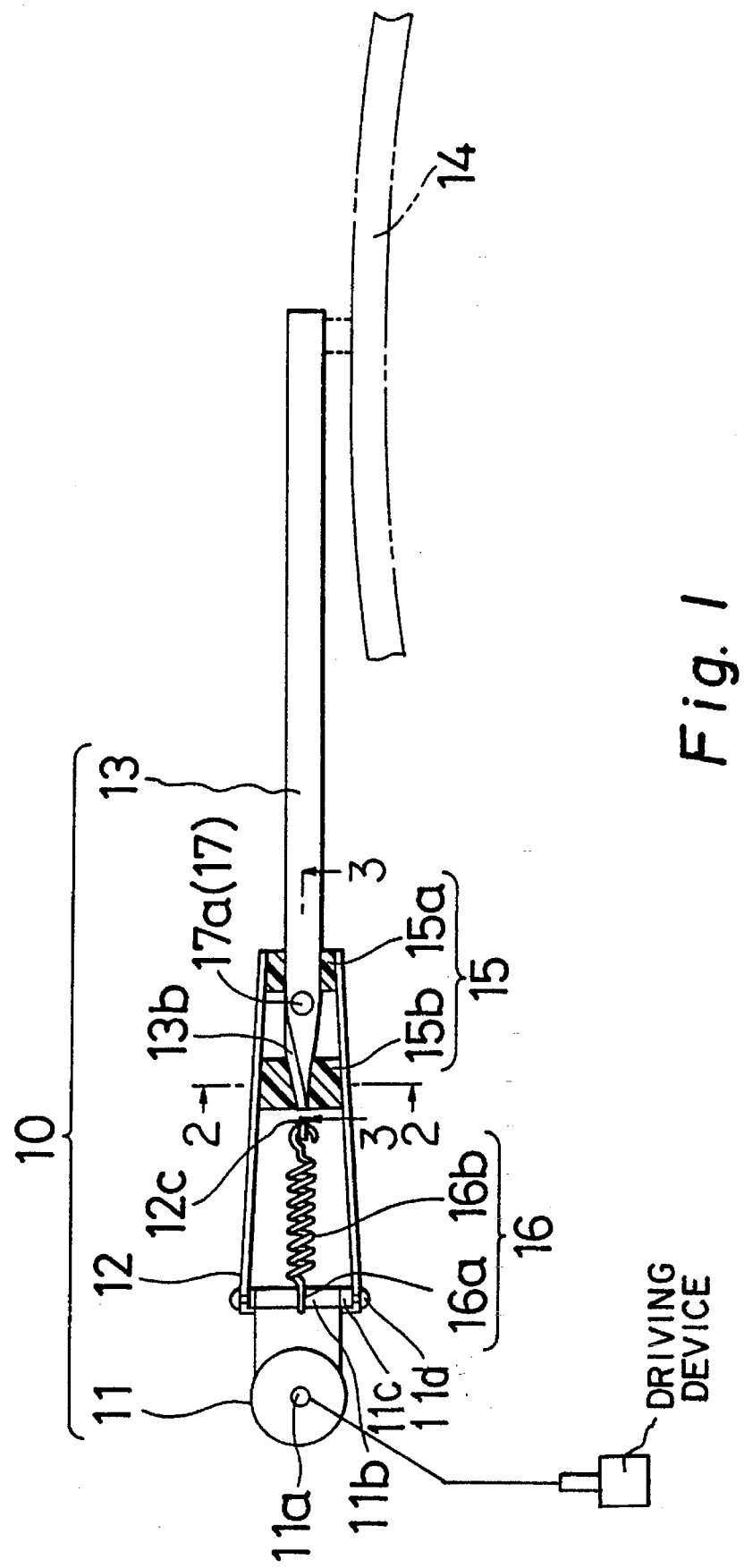
FIG. 1 is a rear view, with parts in cross section, of a wiper device according to a first embodiment of the present invention.
Figure 2:
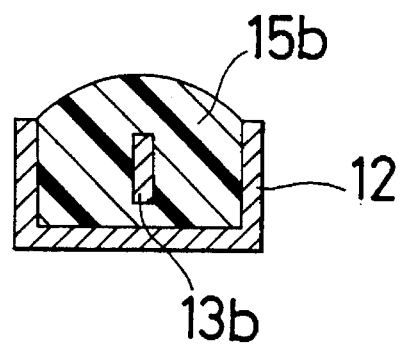
FIG. 2 is an enlarged cross-sectional view taken along line 2—2 of FIG. 1.
Figure 3:
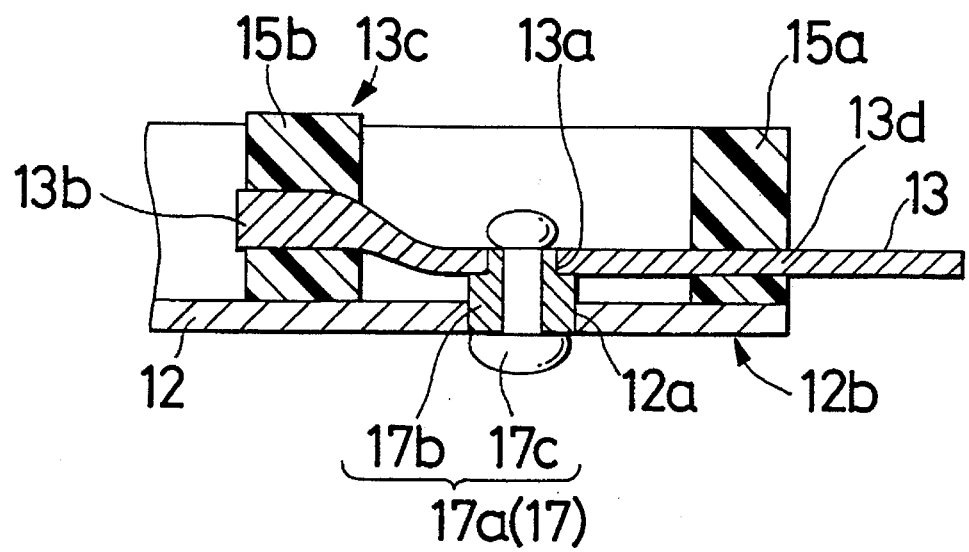
FIG. 3 is an enlarged cross-sectional view taken along line 3—3 of FIG. 1.

FIGS. 1 through 3 show a wiper device according to a first preferred embodiment of the present invention. As shown in FIG. 1, the wiper device S generally comprises a arm system or mechanism 10, a wiper blade 14 and a vibration damping means or damper 15. The arm system 10 is composed of an arm head 11, an arm retainer 12 and an arm piece 13 that are connected together in a manner described later. The wiper blade 14 is attached to the arm piece 13.

A spring member 16 acts between the arm head 11 and the arm piece 13 to urge the arm retainer 12 and the wiper blade 14 toward a surface of a windshield (neither shown) to be wiped by the wiper blade 14, so that the wiper blade 14 is normally held in pressure contact with the surface of the windshield.

The arm head 11 has a connection hole 11a for receiving therein a pivot spindle (not shown) which is connected to a drive unit (not shown) of the wiper device. The arm head 11 further has a retainer pin 11b extending in a direction perpendicular to a longitudinal axis of the connection hole 11a, and a cylindrical sleeve or bushing 11c extending parallel to the retainer pin 11b. The bushing 11c receives therein a pivot pin 11d which extends through and then is riveted to one end of the arm retainer 12. The arm retainer 12 is pivotally movable about the pivot pin 11d in a direction toward and away from the non-illustrated surface of the windshield to be wiped.

The arm retainer 12 is in the form of a channel and has a generally U-shaped cross section, as shown in FIG. 2. The arm retainer 12 and the arm piece 13 are connected together such that a movable portion 17 (FIGS. 1 and 3) is formed between the arm retainer 12 and the arm piece 13. In the first embodiment, the movable portion 17 comprises a pivot shaft 17a which pivotally interconnects the arm retainer 12 and the arm piece 13.

As shown in FIG. 3, the pivot shaft 17a is composed of a rivet 17c extending through a hollow cylindrical collar 17b. The rivet 17c is clinched at opposite ends to opposite ends of the collar 17b which are firmly fitted in a hole 12a of the arm retainer 12 and a hole 13a of the arm piece 13.

The arm piece 13 is in the form of an elongated rectangular bar and has an end portion (an inner end portion) 13b which is twisted at an angle of 90 degrees with respect to a plane of the rest (a body and an opposite end portion) of the arm piece 13. With this twisted configuration of the arm piece 13, it is possible to keep a relatively large space available for installation of the pivot shaft 17a.

The vibration damping means or damper 15 is disposed at the movable portion 17 which is formed between the arm retainer 12 and the arm piece 13. The vibration damper 15 is composed of two rubber vibration damping members 15a and 15b that are fitted in a groove of the channel-shaped arm retainer 12 and located one on each side of the pivot shaft 17a, as shown in FIG. 3. The first rubber vibration damping member 15a is disposed on an end 12b of the arm retainer 12 which is remote from the arm head 11. The second rubber vibration damping member 15b is disposed on the inner end portion 13b of the arm piece 13 which is twisted at 90 degrees relative to the rest of the arm piece 13 (the position of the second rubber vibration damping member 15b is generally designated by 13c). The first and second rubber vibration damping members 15a, 15b embrace longitudinally spaced portions 13b, 13d of the arm piece 13, so that the aforesaid portions 13b, 13d of the arm piece 13 are resiliently supported on the arm retainer 12 by means of the first and second rubber vibration damping members 15a, 15b, respectively.

For purposes of assembly, the rubber vibration damping members 15a, 15b are molded on the corresponding portions 13b, 13d of the arm piece 13. They are attached to the arm retainer 12 when the arm piece 13 is connected to the arm retainer 12 by means of the pivot shaft 17a.

The rubber vibration damping members 15a, 15b which constitute the vibration damper 15 may be made from synthetic rubber or natural rubber. Particularly appropriate materials for use in forming the vibration damper 15 include a high vibration-damping rubber manufactured by Naigai Rubber Industry Co., Ltd. and sold under the tradename "Hanenite". The vibration damper 15 thus provided operates to dampen the vibrational movement of the arm piece 13.

The arm retainer 12 and the arm head 11 are connected by the spring member 16, as shown in FIG. 1. The spring member 16 is a tension coil spring 16b having a hook 16 at one end thereof. The hook 16 is attached to the retainer pin 11b. The opposite end of the tension coil spring 16b is attached to an arm retainer hook 12c which is formed on the arm retainer 12.

The wiper device S of the foregoing construction operates as follows.

When the wiper device S is driven to wipe the surface of a windshield (not shown), the wiper blade 14 (FIG. 1) oscillates or swings back and forth, within a limited angular range, on and along the surface of the windshield. In this instance, an exciting force is produced between the wiper blade 14 and the surface of the windshield. The thus produced exciting force is transmitted from the wiper blade 14 to the arm piece 13. Since the arm piece 13 is pivotally connected to the arm retainer 12 by the pivot shaft 17a, the exciting force is translated into a rotational force or torque tending to turn the arm piece 12 about the pivot shaft 17a.

By virtue of the vibration damper 15 (viz., the first and second rubber vibration damping members 15a, 15b) disposed between the arm piece 13 and the arm retainer 12, the rotational force acting on the arm piece 13 is translated into a force which alternately compresses and stretches the first and second rubber vibration damping members 15a and 15b. The rubber vibration damping members 15a, 15b, while they are elastically deforming, consume a portion of the mechanical exciting force as heat energy. Accordingly, the arm system 10 is prevented from causing self-excited vibration. Thus, the wiper device S is able to operate smoothly and reliably without causing chattering.

Figure 4:
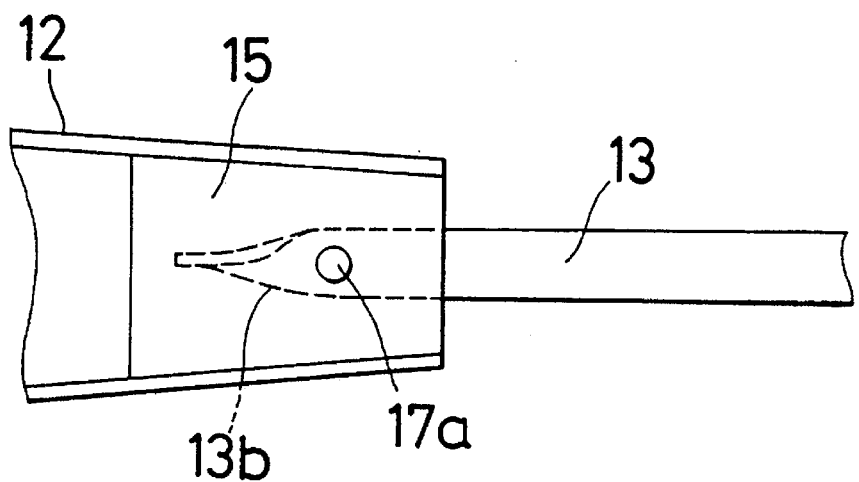
FIG. 4 is a rear view showing a part of a wiper device according to a second embodiment of the present invention.

In the embodiment described above, there are used two rubber vibration damping members 15a, 15b disposed on opposite sides of the pivot shaft 17a. It is possible, according to a second preferred embodiment of the invention, to use a single rubber vibration damping member 15 which, as shown in FIG. 4, is integrally molded with the inner end portion of an arm piece 13. The rubber vibration damping member 15 is connected to an arm retainer 12 by means of a pivot shaft 17a, so that the arm piece 13 is assembled with the arm retainer 12. The rubber vibration damping member 15 is elastically deformable to dampen a mechanical vibrational force exerted thereto via the arm piece 13.

Figure 5:
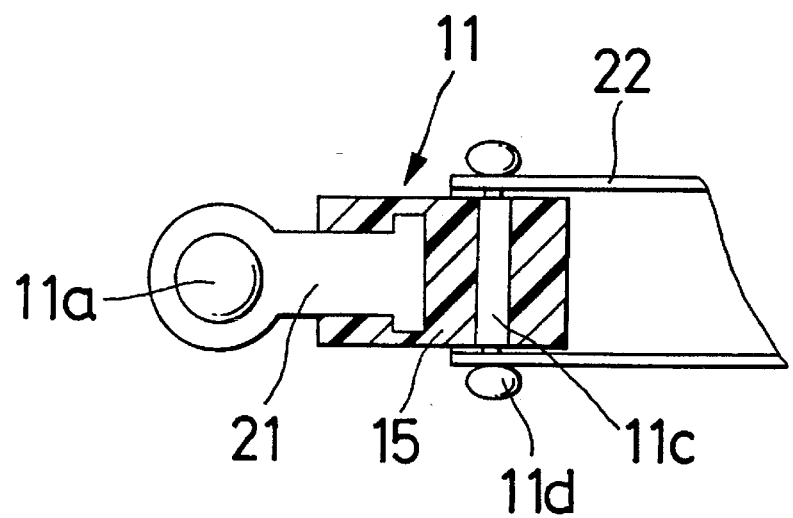
FIG. 5 is a fragmentary rear view, with parts in cross section, of a wiper device according to a third embodiment of the present invention.

FIG. 5 shows a third preferred embodiment of the invention which includes an arm head 11 composed of two parts. The arm head 11 is separated into a first head portion 21 which has a connection hole 11a for receiving therein a pivot spindle (not shown), and a second head portion 22 which includes a tubular bushing 11c for receiving therein a pivot pin 11d. An end portion of the first head portion 21 which is remote from the connection hole 11a and an end portion of the second head portion 22 which includes the bushing 11c are integrally molded with a rubber vibration damping member 15 so that the first and second head portions 21, 22 are joined together via the rubber vibration damping member 15. The rubber vibration damping member 15 is elastically deformable to dampen a vibrational force applied to the second head portion 22 of the arm head 11 via the arm retainer 12 (FIG. 1) and the arm piece 13 (FIG. 1), whereby the arm system 10 (FIG. 1) is prevented from causing self-exciting vibration.

Figure 6:
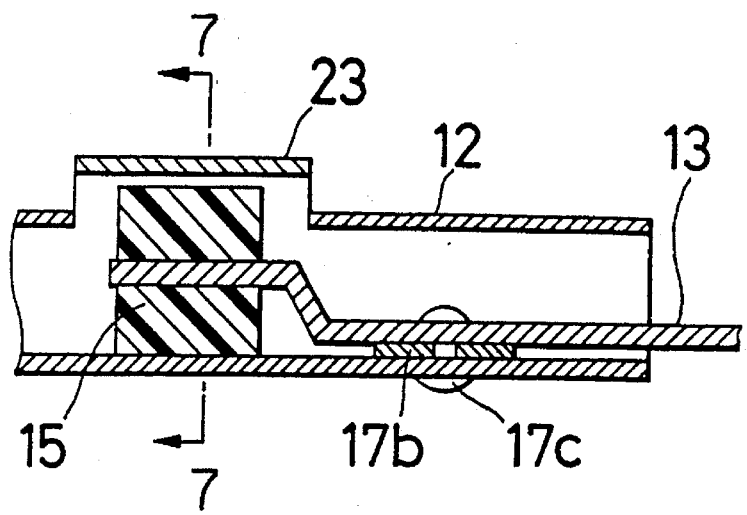
FIG. 6 is a view similar to FIG. 3, but showing a wiper device according to a fourth embodiment of the present invention.
Figure 7:
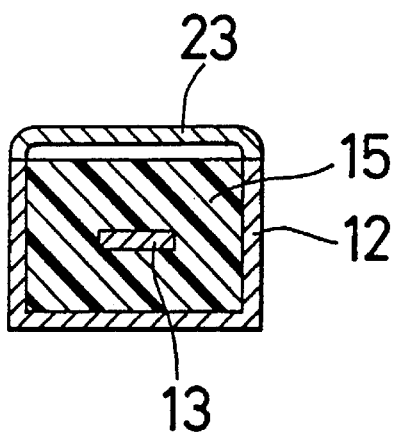
FIG. 7 is a cross-sectional view taken along line 7—7 of FIG. 6.

A fourth preferred embodiment shown in FIGS. 6 and 7 is a modification of the first preferred embodiment shown in FIGS. 1 through 3. Due to the structural similarity, the parts which correspond to those shown in FIGS. 1–3 are designated by the same reference characters, and a further description thereof will be omitted. As previously mentioned, the first preferred embodiment shown in FIGS. 1–3 includes an arm piece 13 whose inner end portion is twisted at an angle of 90 degrees relative to the rest of the arm piece 13. Differing from the first preferred embodiment, the inner end of an arm piece 13 of the fourth preferred embodiment is not twisted but stepped as shown in FIG. 6. The inner end portion extends in the same phase as the rest of the arm piece 13 and is molded with a rubber vibration damping member 15. The rubber vibration damping member 15 is fitted in an arm retainer 12. The arm piece 13 is pivotally connected to an arm retainer 12 by means of a pivot shaft 17c, with a collar 17b disposed between the arm retainer 12 and the arm piece 13. A retainer cover 23 is attached to the arm retainer 12 to cover the rubber vibration damping member 15 received in the arm retainer 12. With this construction, an exciting force transmitted to the arm piece 13 is dampened by the vibration damping member 15 so that self-excited vibration of the arm system 10 (see, FIG. 1) does not take place.

Figure 8:
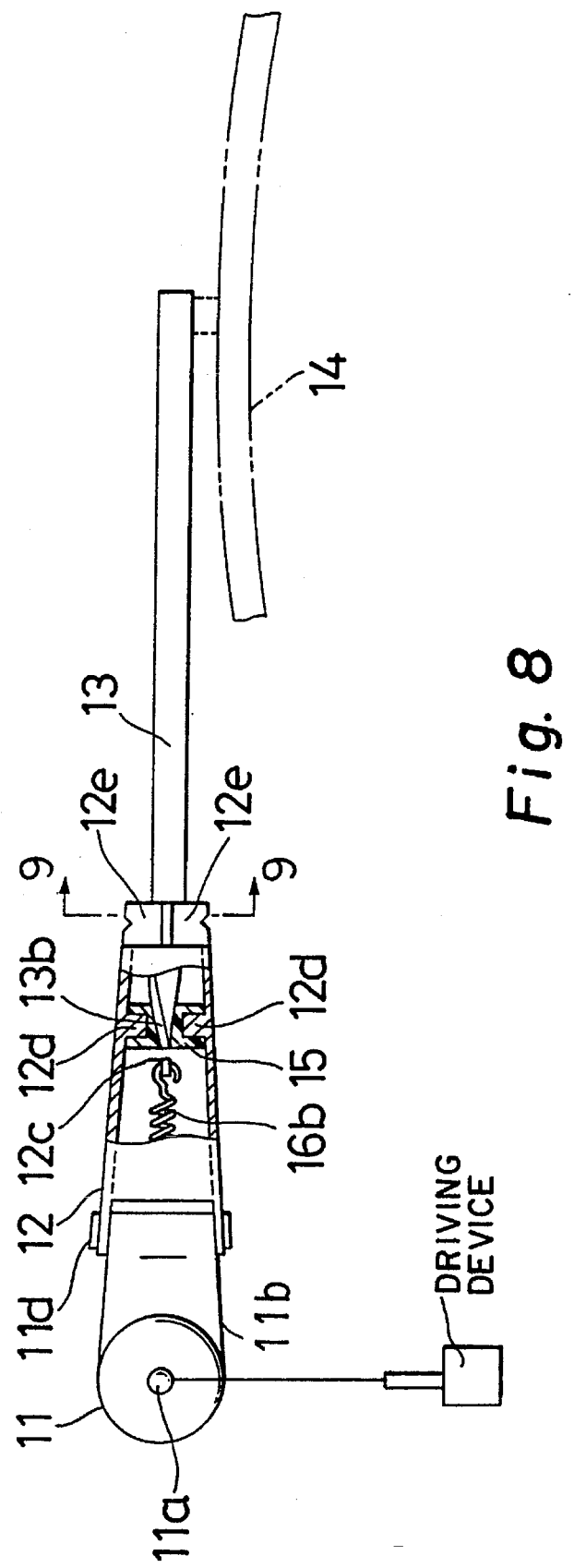
FIG. 8 is a rear view, with parts cutaway for clarity, of a wiper device according to a fifth embodiment of the present invention.
Figure 9:
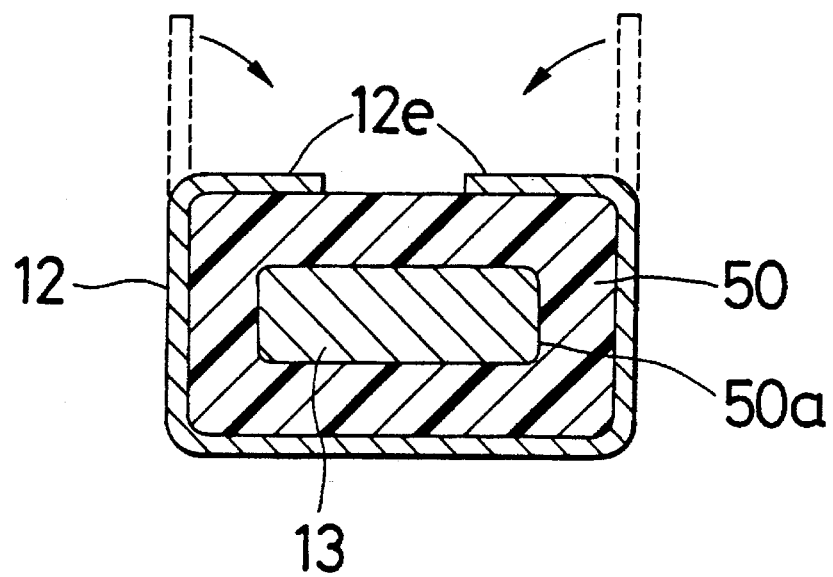
FIG. 9 is an enlarged cross-sectional view taken along line 9—9 of FIG. 8.

FIGS. 8 and 9 illustrate a fifth preferred embodiment of the present invention which is similar to the first preferred embodiment shown in FIGS. 1–3. The parts which are the same as, or correspond to, those shown in FIGS. 1–3 are designated by the same reference characters, and a further description thereof will be omitted.

In the first preferred embodiment shown in FIGS. 1–3, the arm retainer 12 and the arm piece 13 are pivotally connected by the pivot shaft 17a composed of a rivet 17c. As opposed to the first preferred embodiment, the fifth preferred embodiment includes an elastic member 50 extending circumferentially around a portion of the arm piece 13 which forms a center of oscillation of the arm piece 13. The elastic member 50 is supported on the arm retainer 12 together with a rubber vibration damping member 15.

As shown in FIG. 8, the arm retainer 12 has a pair of opposed lateral projections 12d, 12d projecting inwardly from the opposite side walls of the arm retainer 12. The rubber vibration damping member 15 has a generally H-shaped cross section and is fitted with the lateral projections 12d, 12d. The rubber vibration damping member 15 is molded with an inner end portion 13b of the arm piece 13. With this arrangement, the rubber vibration damping member 15 can be attached to the arm retainer 12 with utmost ease. The rubber vibration damping member 15 has a spring constant which is smaller than that of the elastic member 50.

As shown in FIG. 9, the elastic member 50 is composed of a rectangular block and has a through-hole 50a in which the arm piece 13 is inserted. An end portion of the arm retainer 12 which is adjacent to the arm piece 13 has a pair of confronting retainer wings 12e extending parallel to the bottom wall of the arm retainer 12. Before the arm retainer 12 is assembled with the arm piece 13, the retainer wings 12e extend as extensions of opposite side walls of the arm retainer 12, as indicated by the broken lines in FIG. 9. In assembly, the arm piece 13 is fitted into the through-hole 50a of the rectangular elastic member 50 until the elastic member 50 is located at a predetermined position on the arm piece 13. Then, the elastic member 50 is received in the outer end portion of the arm retainer 12, and after that the retainer wings 12e are bent over the elastic member 50. Thus, the arm piece 13 is assembled with the arm retainer 12.

With this construction, the arm retainer 12 and the arm piece 13 are floatingly supported at two positions by means of the elastic member 50 and the rubber vibration damping member 15. When an exciting force is applied to the arm piece 13, the arm piece 13 is caused to oscillate about the elastic member 50. In this instance, since the rubber vibration damping member 15 has a smaller spring constant than the elastic member 50, the oscillating inner end portion 13b (FIG. 8) of the arm piece 13 elastically deforms the rubber vibration damping member 15. With this elastic deformation of the rubber vibration damping member 15, the exciting force transmitted to the arm piece 13 is dampened.

The use of the elastic member 50 obviates the need for a space which would otherwise be provided for attachment of a pivot shaft 17a and a collar 17b to the arm retainer 12 and the arm piece 13. As against the pivot shaft 17a, the elastic member 50 does not require lubrication and is able to increase the mechanical strength and durability of the arm system. In addition, the arm retainer 12 and the arm piece 13 that are assembled together via the elastic member 50 are free from abrasion and, hence, do not encounter problems, such as chattering and contamination with metal powder, which are caused due to sliding contact between metallic components.

The elastic member 50 which is disposed in the arm retainer 12 does not affect or damage a surface treatment (coating) of a component of the arm system. Accordingly, the arm system is highly resistant to corrosion and has an attractive appearance. By the use of the elastic member 50, the number of components of the wiper device can be reduced and, hence, the wiper device can be manufactured and assembled in a less costly manner.

Figure 10:
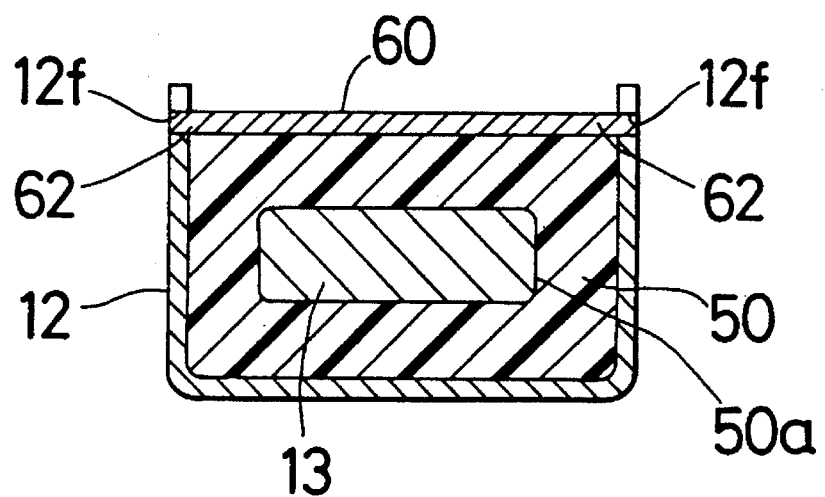
FIG. 10 is a view similar to FIG. 9, but showing a modification according to a sixth embodiment of the present invention.
Figure 11:
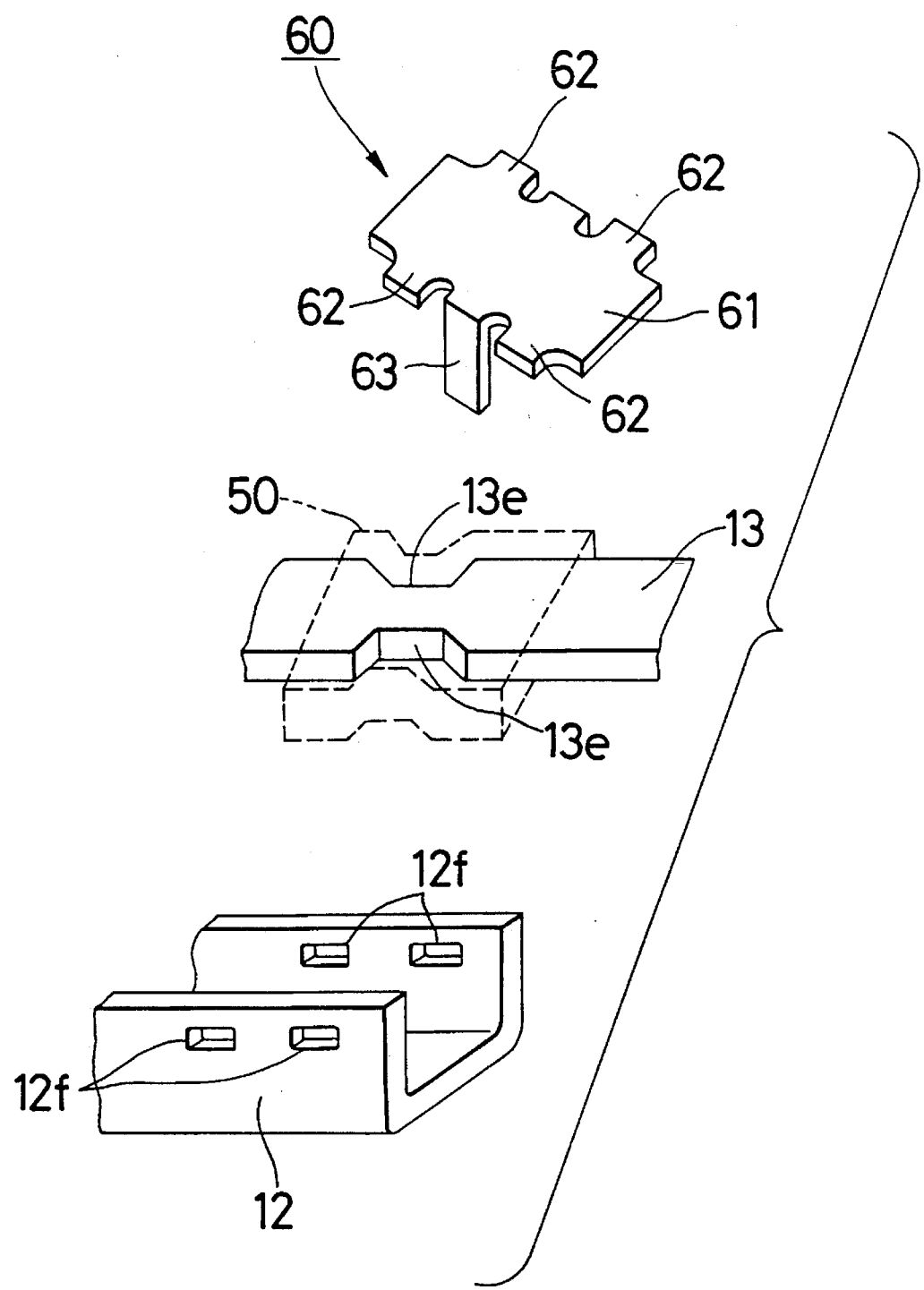
FIG. 11 is an exploded perspective view of a main portion the sixth embodiment shown in FIG. 10.

FIGS. 10 and 11 show a sixth preferred embodiment which is a modification of the fifth preferred embodiment shown in FIGS. 8 and 9.

The modification includes a rectangular plate-like retainer piece 60 which is used in place of the retainer wings 12e in the fifth preferred embodiment.

The outer end portion 12e of the arm retainer 12 which is located adjacent the arm piece 13 has a plurality (two in the illustrated embodiment) of pairs of opposed holes 12f, 12f formed in the opposite side walls of the arm retainer 12 along the longitudinal edges of the respective side walls. The retainer piece 60 has two pairs of lateral projections 62, 62 receivable in the corresponding holes 12f, 12f of the arm retainer 12. As shown in FIG. 11, the two pairs of lateral projections 62, 62 of the rectangular plate-like retainer piece 60 are spaced from one another in a longitudinal direction of the retainer piece 60. A pair of downwardly extending locking lugs 63 (one being shown) is disposed between the pairs of lateral projections 62, 62. The arm piece 13 has a narrowed portion or neck formed by removing a portion of the opposite longitudinal edges of the arm piece 13 in the form of a pair of lateral cutout recesses 13e, 13e. In assembly, an elastic member 50 indicated by the broken lines is fitted over the neck portion having the cutout recesses 13e. Then, the elastic member 50 is placed on the outer end portion of the arm retainer 12, with the cutout recesses 13e held in parallel spaced relation to the pairs of holes 12f. Subsequently, the retainer piece 60 is attached to the retainer arm 12 such that the lateral projections 62 are fitted in the corresponding holes 12f, and the locking lugs 63 are held in alignment with the cutout recesses 13e and hence laterally compress a central portion of the elastic member 50. With this arrangement, the elastic member 50 can be assembled with utmost ease.

Figure 12:
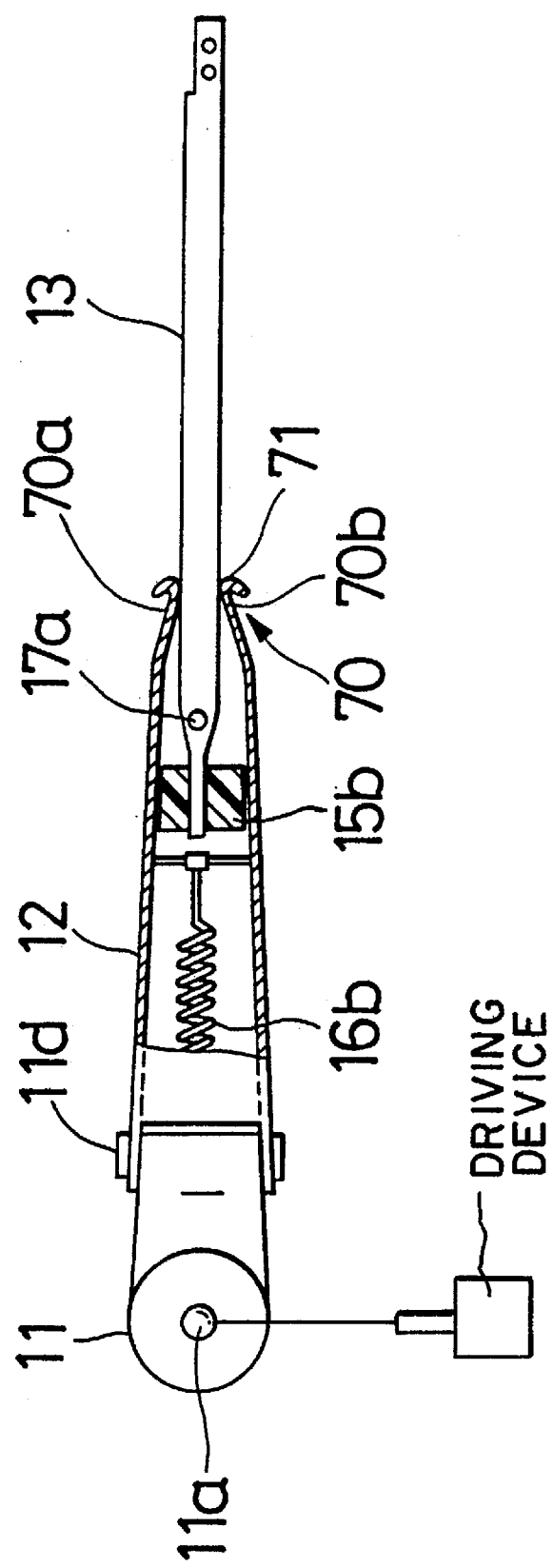
FIG. 12 is a rear view, with parts cutaway for clarity, of a wiper device according to a seventh embodiment of the present invention.
Figure 13:
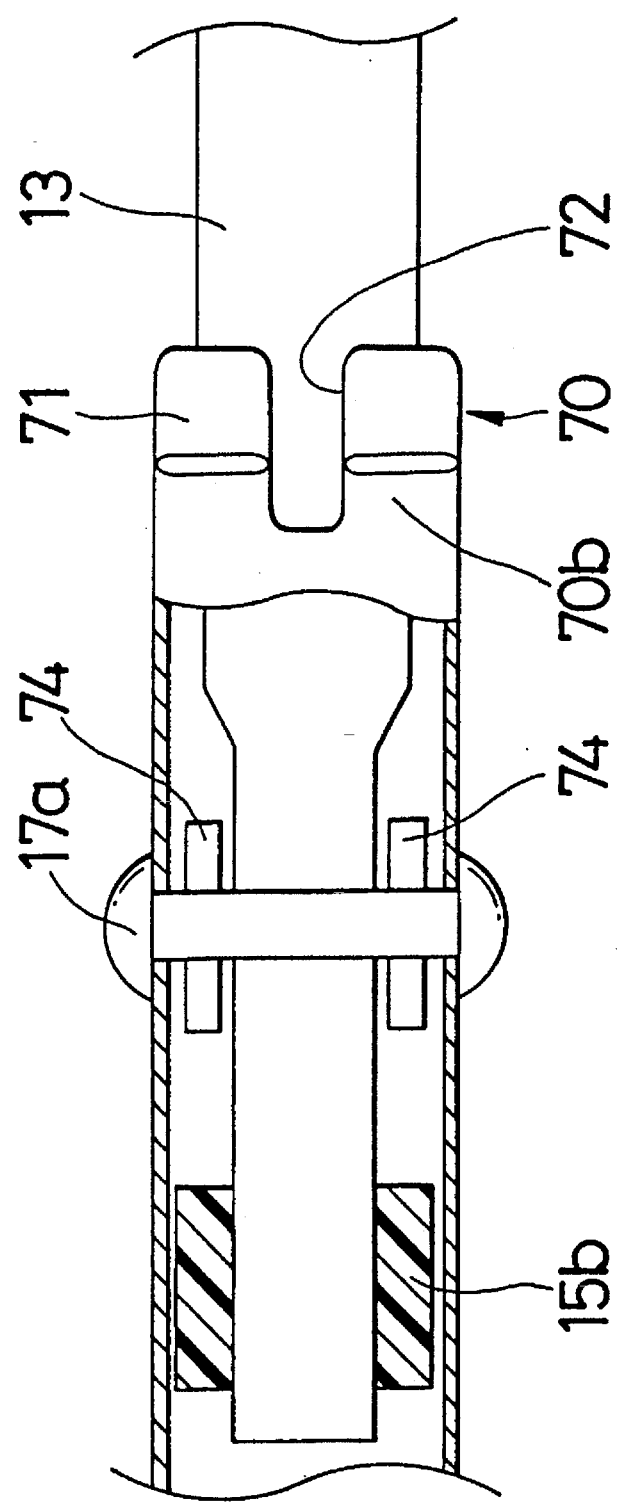
FIG. 13 is an enlarged left side view, with parts cutaway for clarity, of a portion of the wiper device shown in FIG. 12.
Figure 14:
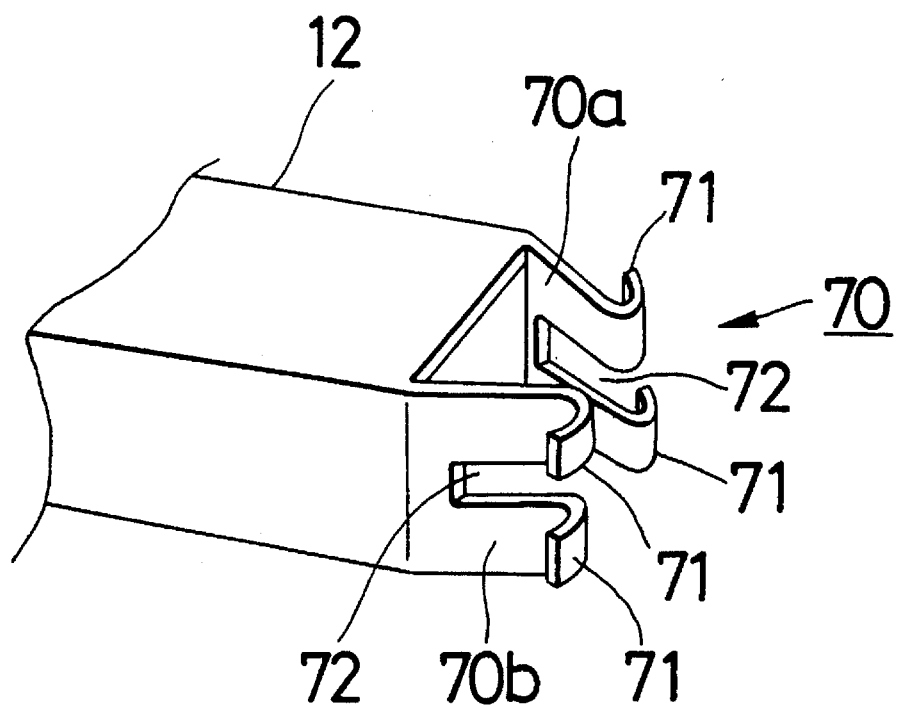
FIG. 14 is a perspective view of an end of an arm retainer of the wiper device shown in FIG. 12.

FIGS. 12 through 14 illustrate a seventh preferred embodiment of the present invention which includes an arm retainer 12 having a resiliently deformable socket portion 70. When the arm retainer 12 is assembled with an arm piece 13, the socket portion 70 resiliently grasps a portion of the arm piece 13 and is resiliently deformable in the wiping direction (a direction of movement of the arm piece 13).

As shown in FIG. 14, the arm retainer 12 is in the shape of an elongated rectangular hollow box and has an end (outer end) adjacent the arm piece 13. The socket portion 70 is formed at the outer end of the arm retainer 12. The socket portion 70 is composed of two confronting, cantilevered plate springs 70a, 70b converging toward each other. Each of the plate springs 70a is bifurcated by a central groove 72 and has an outwardly curled free end 71. Owing to the outwardly curled free ends 71, the arm piece 13 can be inserted smoothly and stably into the arm retainer 12. The bifurcated plate springs 70a are easily to flex and hence able to dampen a larger vibrational force. In FIG. 13, reference numeral 74 designates two washers each of which is disposed between the arm retainer 13 and the arm piece 13 when they are assembled together by means of a pivot shaft 17a.

Since the resiliently deformable socket portion 70 is composed of two confronting, cantilevered plate springs 70a, 70b, the spring constant of the socket portion 70 can be varied by changing the material and heat-treatment conditions of the arm retainer 12. Accordingly, by properly setting the spring constant of the socket portion 70, it is possible to protect a rubber vibration damping member 15b against undue deformation and hence to prolong the lifetime of the rubber vibration damping member 15b.

As described above, a rubber vibration damping member disposed in a movable portion of an arm system is able to control self-exciting vibration of the arm system.

Obviously, various minor changes and modifications of the present invention are possible in the light of the above teaching. It is therefore to be understood that within the scope of the appended claims the invention may be practiced otherwise than as specifically described.

What is claimed is:

1. A wiper device comprising:

a wiper blade for wiping a surface of a windshield;

an elongated arm piece having a proximal end and a distal end, said wiper blade being connected to said arm piece, only at said distal end;

a rubber vibration damping member connected to said proximal end of said arm piece;

an elongated arm retainer supporting said rubber vibration damping member, said rubber vibration damping member and said proximal end of said arm piece being disposed within said arm retainer;

an arm head pivotally supporting said arm retainer;

said arm piece and said retainer extending in substantially the same direction wherein the proximal end of the arm piece is closer to the arm head than the distal end of the arm piece;

a driving device connected to said arm head, said driving device rotating said arm head within an angular range; and a spring member connected between said arm retainer and said arm head, said spring member urging said wiper blade toward the surface of the windshield, wherein, when said driving device is actuated to cause said wiper blade to wipe the surface of the windshield, said rubber vibration damping member dampens an exciting force generated by friction between said wiper blade and the surface of the windshield so that said force is not transmitted from said arm piece to said arm head.

2. The wiper device of claim 1, wherein said arm retainer is an elongated hollow body having opposing side walls.

3. The wiper device of claim 2, wherein a pair of confronting lateral projections is disposed on the opposing side walls of said arm retainer, and said rubber vibration damping member has a generally H-shaped transverse cross section and receives said lateral projections.

4. A wiper device comprising:

a wiper blade for wiping a surface of a windshield;

an arm piece having a first end and a second end, the first end being connected with said wiper blade;

a rubber vibration damping member connected with the second end of said arm piece;

an arm retainer connected with said rubber vibration damping member;

an elastic member holding said arm piece, said elastic member being connected with an end portion of said arm retainer adjacent to said wiper blade, said elastic member having a spring constant greater than that of said rubber vibration damping member;

an arm head pivotally supporting said arm retainer, said arm head being connected with a driving device for rotating said arm head within an angular range; and a spring member connected with said arm retainer and said arm head, said spring member urging said wiper blade toward the surface of the windshield, wherein, when said driving device is actuated to cause said wiper blade to wipe the surface of the windshield, said rubber vibration damping member dampens an exciting force generated by friction between said wiper blade and the surface of said windshield so that said force is not transmitted from said arm piece to said arm head.

5. The wiper device of claim 4, wherein said arm retainer is an elongated hollow body having opposing side walls.

6. The wiper device of claim 5, wherein a pair of confronting lateral projections is disposed on the opposing side walls of said arm retainer, and said rubber vibration damping member has a generally H-shaped transverse cross section and receives said lateral projections.

7. The wiper device of claim 6, wherein said end portion of said arm retainer adjacent to said wiper blade has a pair of confronting retainer wings extending over said elastic member to hold said elastic member within said arm retainer.

8. A wiper device comprising:

a wiper blade for wiping a surface of a windshield;

an arm piece connected with said wiper blade, said arm piece having a generally rectangular transverse cross section with a major dimension lying in a first plane and being twisted to define a connection end portion, said portion having a rectangular transverse cross section with a major dimension lying in a second plane approximately perpendicular to said first plane;

a rubber vibration damping member connected with said connection end portion of said arm piece;

an arm retainer connected with said rubber vibration damping member;

an elastic member holding said arm piece, said elastic member being connected with an end portion of said arm retainer adjacent to said wiper blade;

an arm head pivotally supporting said arm retainer, said arm head being connected with a driving device for rotating said arm head within an angular range; and a spring member connected with said arm retainer and said arm head, said spring member urging said wiper blade toward the surface of the windshield, wherein, when said driving device is actuated to cause said wiper blade to wipe the surface of the windshield, said rubber vibration damping member dampens an exciting force generated by friction between said wiper blade and the surface of the windshield so that said force is not transmitted from said arm piece to said arm head.

9. The wiper device of claim 8, wherein said elastic member has a spring constant greater than that of said rubber vibration damping member.

10. The wiper device of claim 8, wherein said arm retainer is an elongated hollow body having opposing side walls.

11. The wiper device of claim 10, wherein a pair of confronting lateral projections is disposed on the opposing side walls of said arm retainer, and said rubber vibration damping member has a generally H-shaped transverse cross section and receives said lateral projections.

12. The wiper device of claim 11, wherein said end portion of said arm retainer adjacent to said wiper blade has a pair of confronting retainer wings extending over said elastic member to hold said elastic member within said arm retainer.

\* \* \* \* \*